(12) United States Patent
Miki et al.

(10) Patent No.: US 12,247,871 B2
(45) Date of Patent: Mar. 11, 2025

(54) SUPERCONDUCTING SINGLE-PHOTON DETECTION SYSTEM (71) Applicant: National Institute of Information and Communications Technology, Koganei (JP)

(72) Inventors: Shigehito Miki, Koganei (JP); Hirotaka Terai, Koganei (JP)

(73) Assignee: NATIONAL INSTITUTE OF INFORMATION AND COMMUNICATIONS TECHNOLOGY, Koganei (JP)

(*) Notice: Subject to any disclaimer, the term of this patent is extended or adjusted under 35 U.S.C. 154(b) by 0 days.

(21) Appl. No.: 18/292,490

(22) PCT Filed: Jul. 28, 2022

(86) PCT No.: PCT/JP2022/029097
§ 371 (c)(1),
(2) Date: Jan. 26, 2024

(87) PCT Pub. No.: WO2023/008523
PCT Pub. Date: Feb. 2, 2023

(65) Prior Publication Data
US 2024/0344882 A1 Oct. 17, 2024

(30) Foreign Application Priority Data
Jul. 30, 2021 (JP) ................. 2021-125958

(51) Int. Cl.
G01J 1/44 (2006.01)
G01J 1/04 (2006.01)
(52) U.S. Cl.
CPC ............ *G01J 1/44* (2013.01); *G01J 1/0425* (2013.01); *G01J 2001/442* (2013.01)

(58) Field of Classification Search
CPC ....... G01J 1/44; G01J 1/0425; G01J 2001/442
See application file for complete search history.

(56) References Cited

U.S. PATENT DOCUMENTS 4,675,529 A * 6/1987 Kushida ............... G01N 21/645
600/478
2018/0284413 A1* 10/2018 Kubo ................ G01N 21/6458
(Continued)

FOREIGN PATENT DOCUMENTS

JP H11072757 A 3/1999
JP 5419122 B2 2/2014
(Continued)

*Primary Examiner* — Georgia Y Epps
*Assistant Examiner* — Don J Williams
(74) *Attorney, Agent, or Firm* — Alleman Hall & Tuttle LLP (57) ABSTRACT A superconducting single-photon detection system includes: a plurality of optical transmission paths through each of which a photon emitted from a light source is transmitted; a plurality of superconducting single-photon detectors (hereinafter referred to as "SSPDs") that are independent of each other and in one-to-one correspondence with the optical transmission paths; and a superconducting logic circuit that multiplexes first pulse signals output from the SSPDs. A photon entry time at which the photon enters each of the SSPDs through a corresponding one of the optical transmission paths is different for each of the optical transmission paths, and a difference in the photon entry time between the optical transmission paths is greater than a pulse width of a corresponding one of second pulse signals output from the superconducting logic circuit.

8 Claims, 8 Drawing Sheets (56) References Cited

U.S. PATENT DOCUMENTS

2019/0049294 A1 2/2019 Miki et al.
2022/0136895 A1 5/2022 Takeuchi et al.

FOREIGN PATENT DOCUMENTS

| JP | 5846622 B2 | 1/2016 |
| JP | 5875045 B2 | 3/2016 |
| JP | 6598302 B2 | 10/2019 |
| WO | 2020179554 A1 | 9/2020 |

\* cited by examiner

FIG.7B ional single-photon detectors (such as avalanche photodiode detectors) and thus are promising for use in a wide variety of fields such as quantum communication.

SUPERCONDUCTING SINGLE-PHOTON DETECTION SYSTEM

TECHNICAL FIELD

The present disclosure relates to a superconducting single-photon detection system.

BACKGROUND ART

Superconducting single-photon detectors (sometimes abbreviated as "SSPDs" hereinafter) offer performance advantages such as high detection efficiency, high time resolution (timing jitter), and low dark count rate over conventional single-photon detectors (such as avalanche photodiode detectors) and thus are promising for use in a wide variety of fields such as quantum communication.

SSPDs are required to operate in refrigerators at around 2.3 Kelvin (K). For a multi-pixel SSPD array including an array of light receiving parts of many SSPDs to operate in a refrigerator, an increased number of transmission cables are needed to read out pulse signals output from the SSPDs. This causes penetration of external heat through the cables, and the heat penetration could make it difficult to operate the multi-pixel SSPD array at extremely low temperatures.

To address this problem, the present disclosers have proposed signal processing circuitry including a superconducting flux quantum (SFQ) circuit for reading out signals of a multi-pixel SSPD array by using transmission cables the number of which is smaller than the number of SSPDs of the multi-pixel SSPD array (see Patent Literatures 1 to 4, for example).

CITATION LIST

Patent Literature

PTL 1: Japanese Patent No. 5419122
PTL 2: Japanese Patent No. 5846622
PTL 3: Japanese Patent No. 5875045
PTL 4: Japanese Patent No. 6598302

SUMMARY OF INVENTION

Technical Problem

While the multi-pixel SSPD array as mentioned above includes an array of light receiving parts of SSPDs, the optical transmission path through which photons enter the multi-pixel SSPD array has a single light input part. No consideration is made of processing of signals output from SSPDs that are independent of each other and in one-to-one correspondence with a plurality of optical transmission paths.

An exemplary object of the present disclosure is to provide a superconducting single-photon detection system in which output signals from SSPDs that are independent of each other and in one-to-one correspondence with a plurality of optical transmission paths can be processed more suitably than ever before.

Solution to Problem

A superconducting single-photon detection system according to one aspect of the present disclosure includes: a plurality of optical transmission paths through each of which a photon emitted from a light source is transmitted; a plurality of superconducting single-photon detectors (hereinafter referred to as "SSPDs") that are independent of each other and in one-to-one correspondence with the optical transmission paths; and a superconducting logic circuit that multiplexes first pulse signals output from the SSPDs, wherein a photon entry time at which the photon enters each of the SSPDs through a corresponding one of the optical transmission paths is different for each of the optical transmission paths, and a difference in the photon entry time between the optical transmission paths is greater than a pulse width of a corresponding one of second pulse signals output from the superconducting logic circuit.

Advantageous Effects of Invention

The superconducting single-photon detection system according to one aspect of the present disclosure can offer the advantage that output signals from SSPDs that are independent of each other and in one-to-one correspondence with a plurality of optical transmission paths can be processed more suitably than ever before.

DESCRIPTION OF EMBODIMENTS

In recent years, attempts have been undertaken to put quantum networks and quantum internet service into practice. It is expected that the number of photon detectors required for one node in a quantum network or quantum internet service will increase. The need for photon detectors is growing as competition in research and development for quantum computers is increasingly fierce. Scale-up of a quantum computer is expected to entail an increase in the required number of photon detectors. For example, the development of a "fault-tolerant universal quantum computer" is pursued in the project named "Quantum Cyberspace with Networked Quantum Computer", and it is estimated that more than 100 photon detectors need to be constructed for one node to put the fault-tolerant universal quantum computer into practice.

If output signals from SSPDs that are independent of each other and in one-to-one correspondence with a plurality of optical transmission paths are processed only by a logic circuit, the circuit configuration could be complicated and large-scaled.

As a result of intensive studies, the present disclosers have found that the above problem can be alleviated based on a combination of a technology for delaying photons in optical transmission paths and a technology for multiplexing pulse signals in a superconducting logic circuit. Based on this finding, the present disclosers have arrived at the following aspects of the present disclosure.

That is, a superconducting single-photon detection system according to a first aspect of the present disclosure includes: a plurality of optical transmission paths through each of which a photon emitted from a light source is transmitted; a plurality of superconducting single-photon detectors (hereinafter referred to as "SSPDs") that are independent of each other and in one-to-one correspondence with the optical transmission paths; and a superconducting logic circuit that multiplexes first pulse signals output from the SSPDs, wherein a photon entry time at which the photon enters each of the SSPDs through a corresponding one of the optical transmission paths is different for each of the optical transmission paths, and a difference in the photon entry time between the optical transmission paths is greater than a pulse width of a corresponding one of second pulse signals output from the superconducting logic circuit.

In the above configuration of the superconducting single-photon detection system according to the first aspect, output signals from the SSPDs which are independent of each other and in one-to-one correspondence with the optical transmission paths can be processed more suitably than ever before. Specifically, the above-described features of the superconducting single-photon detection system according to the first aspect offer the following advantage: despite the fact that the superconducting logic circuit multiplexes the first pulse signals output from the SSPDs, the second pulse signals, each of which is generated based on a corresponding one of the first pulse signals, can be suitably separated from each other. That is, in the superconducting single-photon detection system according to the first aspect, the second pulse signals resulting from multiplexing by the superconducting logic circuit include information indicating which of the SSPDs each second pulse signal is derived from. In this case, since the superconducting logic circuit only needs to have the function of signal multiplexing, the configuration of the superconducting logic circuit can be simplified, and the scalability of the superconducting single-photon detection system can be ensured. Thus, the superconducting single-photon detection system according to the first aspect can be used, for example, as a high-performance multichannel photon detection system for constructing a quantum network or a quantum computer.

A superconducting single-photon detection system according to a second aspect of the present disclosure includes the features of the superconducting single-photon detection system according to the first aspect, wherein each of the optical transmission paths may include an optical fiber cable, and the optical fiber cables of the optical transmission paths may have different cable lengths.

In the above configuration of the superconducting single-photon detection system according to the second aspect, since the optical fiber cables have different cable lengths, the photon entry time at which the photon enters each of the SSPDs can easily be adjusted for each of the optical fiber cables.

A superconducting single-photon detection system according to a third aspect of the present disclosure includes the features of the superconducting single-photon detection system according to the first or second aspect, wherein a time at which each of the second pulse signals is output may vary depending on a time at which the photon is emitted from the light source.

In the above configuration of the superconducting single-photon detection system according to the third aspect, each of the second pulse signals resulting from multiplexing by the superconducting logic circuit has a time information identifying function for identifying the time at which the photon was emitted from the light source.

A superconducting single-photon detection system according to a fourth aspect of the present disclosure includes the features of the superconducting single-photon detection system according to any one of the first to third aspects, wherein each of the second pulse signals may have a smaller pulse width than a corresponding one of the first pulse signals.

In the above configuration of the superconducting single-photon detection system according to the fourth aspect, the difference in the entry time of the photon P can be smaller than in any case where the superconducting logic circuit outputs the first pulse signals coming from the SSPDs without reshaping the first pulse signals. As such, the superconducting single-photon detection system according to the fourth aspect can suitably shorten the duration of a train of the second pulse signals resulting from multiplexing by the superconducting logic circuit.

Thus, when used, for example, in a quantum network or a quantum computer, the superconducting single-photon detection system according to the fourth aspect can increase the operation speed of the quantum network or the quantum computer.

A superconducting single-photon detection system according to a fifth aspect of the present disclosure includes the features of the superconducting single-photon detection system according to any one of the first to fourth aspects, wherein a slope of a rising waveform of each of the first pulse signals may vary depending on the number of the photons that enter a corresponding one of the SSPDs after being emitted from the light source, and the superconducting logic circuit may output each of the second pulse signals at a time at which an output value of the rising waveform of a corresponding one of the first pulse signals reaches a predetermined level.

In the above configuration of the superconducting single-photon detection system according to the fifth aspect, each of the second pulse signals resulting from multiplexing by the superconducting logic circuit includes photon number identification information for identifying the number of the photons which entered a corresponding one of the SSPDs.

A superconducting single-photon detection system according to a sixth aspect of the present disclosure includes the features of the superconducting single-photon detection system according to any one of the first to fifth aspects and may further include: a driver circuit to which each of the second pulse signals output from the superconducting logic circuit is input as a set signal; and a reset signal generating circuit that generates a reset signal for the driver circuit based on each of the second pulse signals, wherein a width of an output pulse signal output from the driver circuit may correspond to a time difference between a time at which the set signal is input to the driver circuit and a time at which the reset signal is input to the driver circuit.

In the above configuration of the superconducting single-photon detection system according to the sixth aspect, the inclusion of the driver circuit and the reset signal generating circuit makes it possible to set the width of the output pulse signal output from the driver circuit to a desired value. Thus, an output pulse signal train matching the specifications required in a subsequent signal processor or a subsequent application can be generated, for example, by appropriately combining the width of the output pulse signal and the difference in the photon entry time.

A superconducting single-photon detection system according to a seventh aspect of the present disclosure includes the features of the superconducting single-photon detection system according to the sixth aspect, wherein: the reset signal generating circuit may include a switch circuit including an ON terminal, an OFF terminal, an input terminal, and an output terminal, a delay circuit, and a frequency divider circuit including a number N of ½ frequency dividers, wherein N is an integer of 1 or more; input of a signal to the ON terminal of the switch circuit may enable communication between the input terminal and the output terminal in the switch circuit; input of a signal to the OFF terminal of the switch circuit may disable the communication between the input terminal and the output terminal in the switch circuit; in the reset signal generating circuit, the output terminal of the switch circuit may be connected to the input terminal of the switch circuit via the delay circuit and connected to the OFF terminal of the switch circuit and a reset terminal of the driver circuit via the frequency divider circuit; and a time at which a signal is input to the reset terminal of the driver circuit may be determined by a time delay of a pulse signal in the delay circuit and the number N of the ½ frequency dividers in the frequency divider circuit.

In the above configuration of the superconducting single-photon detection system according to the seventh aspect, the time at which a signal is input to the reset terminal of the driver circuit can be determined as appropriate by the time delay of the pulse signal in the delay circuit and the number N of the ½ frequency dividers in the frequency divider circuit. This makes it possible to set the width of the output pulse signal output from the driver circuit to a desired value.

A superconducting single-photon detection system according to an eighth aspect of the present disclosure includes the features of the superconducting single-photon detection system according to any one of the first to fifth aspects and may further include: a ½ frequency divider to which each of the second pulse signals output from the superconducting logic circuit is input; and a driver circuit connected to the ½ frequency divider, wherein the ½ frequency divider may include first and second output terminals, one of which is connected to a set terminal of the driver circuit and the other of which is connected to a reset terminal of the driver circuit.

In the above configuration of the superconducting single-photon detection system according to the eighth aspect, the output pulse signal output from the driver circuit is in a voltage-inverting form, and this makes it possible to identify output information from each of the SSPDs at the time at which the voltage is inverted. As such, the duration of an output pulse signal train can be shorter than in any case where the output pulse signal is in a pulse form.

Hereinafter, specific examples of the above aspects of the present disclosure will be described with reference to the drawings. All of the specific examples described below are merely examples of the above aspects. Although shapes, materials, numerical values, constituent elements, the positions of the constituent elements, and the way of connection between the constituent elements are mentioned below, they are not intended to limit the above aspects unless recited in the claims. The constituent elements described below include those that are not recited in the independent claim which defines the generic concept of the above aspects, and such constituent elements are described as optional elements. Some constituent elements are denoted by the same reference signs throughout the drawings, and repeated description of such constituent elements may be omitted. In the drawings, the constituent elements are schematically depicted for ease of understanding, and the shapes of, and the dimensional ratio between, the depicted constituent elements may be different from actual ones.

First Embodiment

Figure 1:
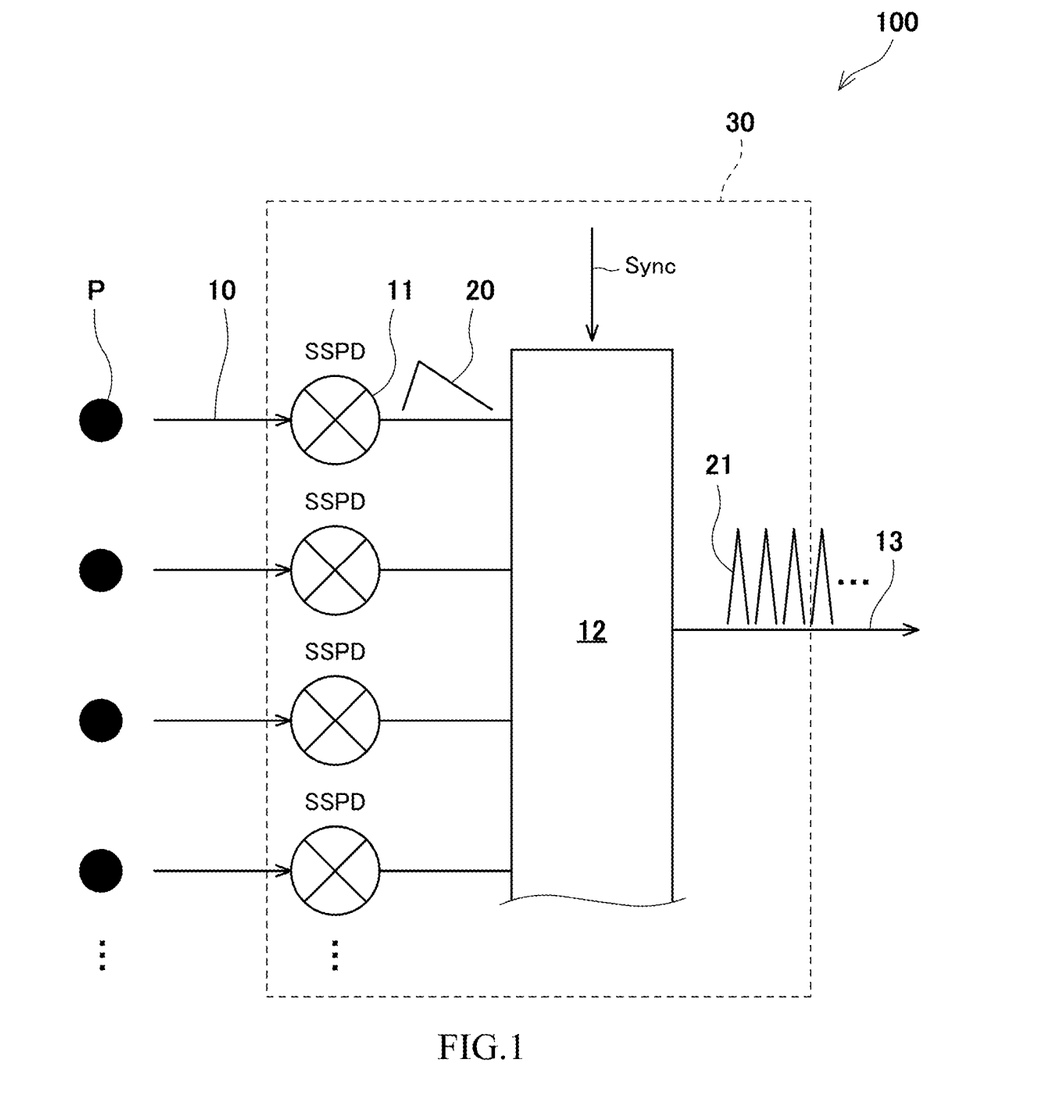
FIG. 1 shows an example of a superconducting single-photon detection system of a first embodiment.

FIG. 1 shows an example of a superconducting single-photon detection system of a first embodiment.

In the example of FIG. 1, a superconducting single-photon detection system 100 includes a plurality of optical transmission paths 10, a plurality of SSPDs 11, and a superconducting logic circuit 12. Although FIG. 1 shows a configuration including four optical transmission paths 10 and four SSPDs 11, the number and arrangement of the optical transmission paths 10 and the SSPDs 11 may be freely chosen.

The optical transmission paths 10 are paths through each of which a photon emitted from a light source is transmitted. The optical transmission paths 10 may take any form that permits transmission of photons to the SSPDs 11. For example, each of the optical transmission paths 10 may include an optical fiber cable or may be a space through which light is transmitted between devices without the use of any cable.

The SSPDs 11 are independent of each other and in one-to-one correspondence with the optical transmission paths 10. Each of the SSPDs 11 is configured to detect photons P emitted from an unshown light source one by one. The configuration and operation of such SSPDs are well-known and will not be described in detail.

The superconducting logic circuit 12 is a circuit that multiplexes pulse signals 20 output from the SSPDs 11. Specifically, the superconducting logic circuit 12 may be configured as an OR circuit that operates in a superconducting state. In this case, the superconducting logic circuit 12 can output a train of pulse signals 21 to a single transmission cable 13 (e.g., a coaxial cable) in synchronization with signals $S_{ync}$ generated per cycle. The train of pulse signals 21 is generated by multiplexing the pulse signals 20 output from the SSPDs 11. The superconducting logic circuit 12 may be any form of logic circuit that operates in a superconducting state. For example, the superconducting logic circuit 12 may be configured as a superconducting single flux quantum (SFQ) circuit.

The superconducting logic circuit 12, which operates in a superconducting state, is cooled to an extremely low temperature by a refrigerator 30 (e.g., a GM refrigerator), together with the SSPDs 11. If the pulse signals 20 output from the SSPDs 11 were not multiplexed by the superconducting logic circuit 12, an increase in the number of the SSPDs 11 would entail an increase in the number of coaxial cables which are an example of the transmission cable 13, and the increased number of coaxial cables would result in a large thermal load on (a large amount of heat penetration into) the refrigerator 30. In this case, the superconducting logic circuit 12 could be difficult to incorporate into the refrigerator 30. With the use of the superconducting logic circuit 12 of the present example, the above-described configuration of the superconducting logic circuit 12 leads to only one coaxial cable extending to an external room temperature environment. This can reduce the possibility that an increase in thermal load on the refrigerator 30 makes it difficult to incorporate the superconducting logic circuit 12 into the refrigerator 30.

Optical fiber cables, which are an example of the optical transmission paths 10, are made of quartz glass or plastic and thus have a lower thermal conductivity than coaxial cables made of metal. Thus, even when an increased number of optical fiber cables are used, an increase in thermal load on the refrigerator 30 can be suitably reduced.

In the superconducting single-photon detection system 100 of the present embodiment, a photon entry time at which the photon P enters each of the SSPDs 11 through a corresponding one of the optical transmission paths 10 is different for each of the optical transmission paths 10. In addition, a difference in the photon entry time between the optical transmission paths 10 is greater than the pulse width of a corresponding one of the pulse signals 21 output from the superconducting logic circuit 12. The details of this configuration of the superconducting single-photon detection system 100 will be described in a working example below.

In the superconducting single-photon detection system 100 of the present embodiment, output signals from the SSPDs 11 which are independent of each other and in one-to-one correspondence with the optical transmission paths 10 can be processed more suitably than ever before. Specifically, the above-described features of the superconducting single-photon detection system 100 of the present embodiment offer the following advantage: despite the fact that the superconducting logic circuit 12 multiplexes the pulse signals 20 output from the SSPDs 11, the pulse signals 21, each of which is generated based on a corresponding one of the pulse signals 20, can be suitably separated from each other. That is, in the superconducting single-photon detection system 100 of the present embodiment, the pulse signals 21 resulting from multiplexing by the superconducting logic circuit 12 include information indicating which of the SSPDs 11 each pulse signal 21 is derived from. In this case, since the superconducting logic circuit 12 only needs to have the function of signal multiplexing, the configuration of the superconducting logic circuit 12 can be simplified, and the scalability of the superconducting single-photon detection system 100 can be ensured. Thus, the superconducting single-photon detection system 100 of the present embodiment can be used, for example, as a high-performance multichannel photon detection system for constructing a quantum network or a quantum computer.

Working Example

Figure 2:
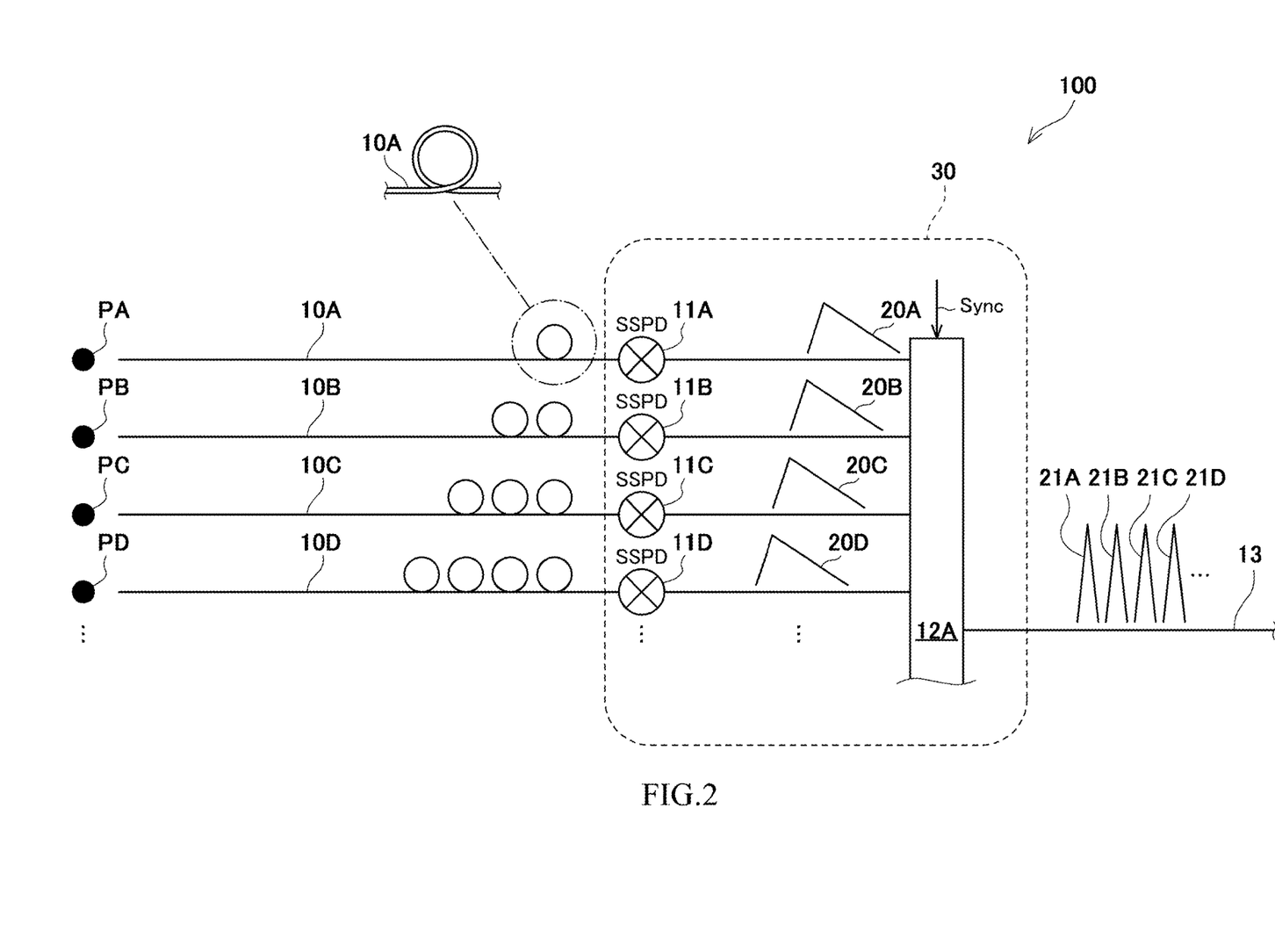
FIG. 2 shows an example of a superconducting single-photon detection system according to a working example of the first embodiment.

FIG. 2 shows an example of a superconducting single-photon detection system according to a working example of the first embodiment.

In the example of FIG. 2, the optical transmission paths 10 include optical fiber cables 10A, 10B, 10C, and 10D, respectively.

The optical fiber cable 10A is located between an unshown light source and an SSPD 11A. Thus, a photon PA enters the SSPD 11A through the optical fiber cable 10A at a certain time.

The optical fiber cable 10B is located between the light source and an SSPD 11B. Thus, a photon PB enters the SSPD 11B through the optical fiber cable 10B at a certain time.

The optical fiber cable 10C is located between the light source and an SSPD 11C. Thus, a photon PC enters the SSPD 11C through the optical fiber cable 10C at a certain time.

The optical fiber cable 10D is located between the light source and an SSPD 11D. Thus, a photon PD enters the SSPD 11D through the optical fiber cable 10D at a certain time.

In the superconducting single-photon detection system 100 of the present working example, the optical fiber cables 10A, 10B, 10C, and 10D have different cable lengths.

Specifically, as shown in an enlarged portion of FIG. 2, the optical fiber cable 10A includes one ring-shaped portion in which the cable makes a loop. The optical fiber cable 10B includes two ring-shaped portions in each of which the cable makes a loop. The optical fiber cable 10C includes three ring-shaped portions in each of which the cable makes a loop. The optical fiber cable 10D includes four ring-shaped portions in each of which the cable makes a loop.

As described above, in the superconducting single-photon detection system 100 of the present working example, the optical fiber cables 10A, 10B, 10C, and 10D have different cable lengths. Thus, the photon entry time at which the photon P enters each of the SSPDs 11A, 11B, 11C, and 11D can easily be adjusted for each of the optical fiber cables 10A, 10B, 10C, and 10D.

Figure 3:
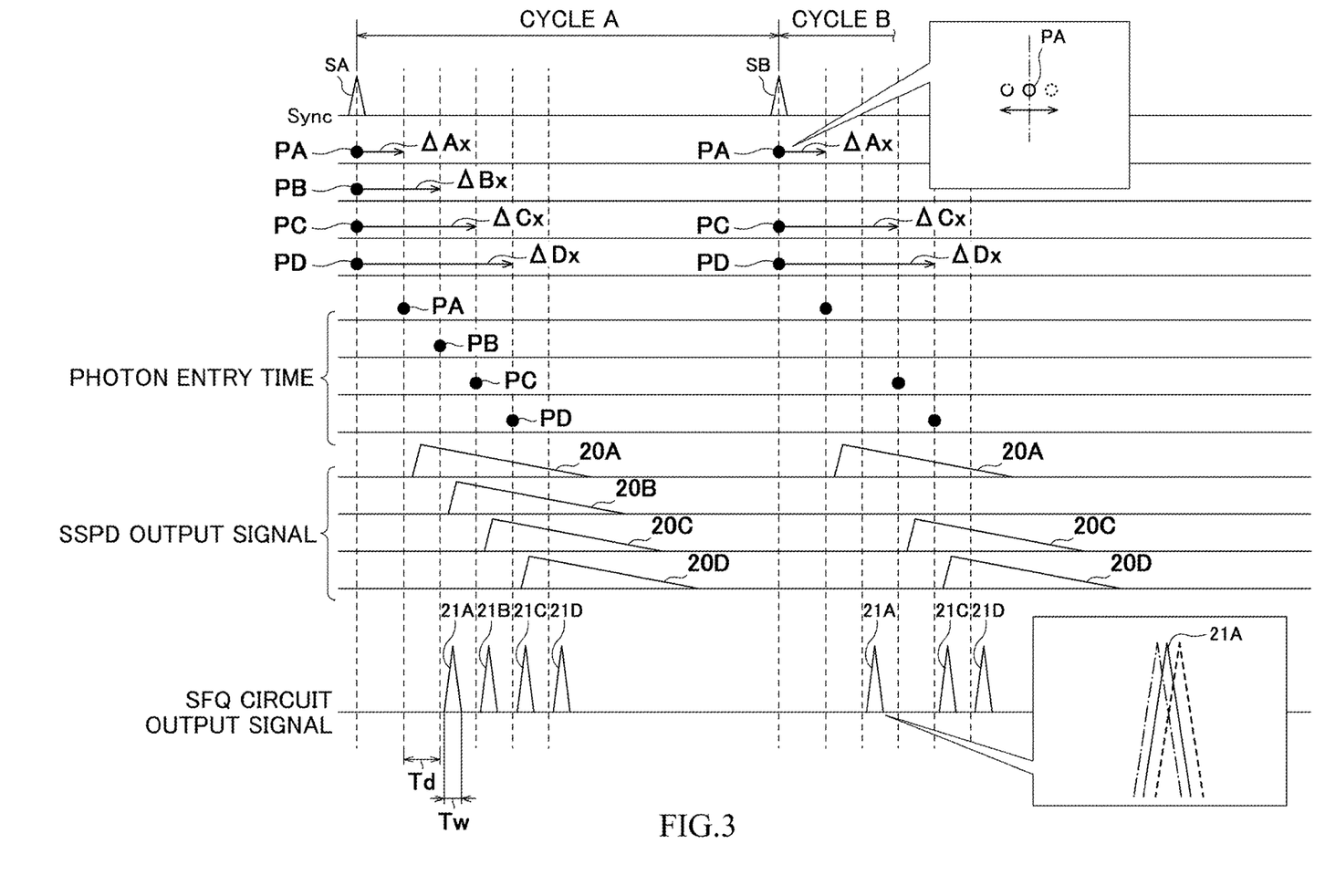
FIG. 3 shows examples of output signals of the superconducting single-photon detection system according to the working example of the first embodiment.

FIG. 3 shows examples of output signals of the superconducting single-photon detection system according to the working example of the first embodiment. In FIG. 3, the optical fiber cables 10A, 10B, 10C, and 10D and the SSPDs 11A, 11B, 11C, and 11D of FIG. 2 are omitted.

In the example of FIG. 3, the photons PA, PB, PC, and PD are emitted from the light source in synchronization with a trigger signal SA having a predetermined cycle A. Due to the photon delay effect in the optical fiber cables 10A, 10B, 10C, and 10D, entry of the photon P into the SSPD 11A through the optical fiber cable 10A is delayed by a time interval $\Delta Ax$ with respect to the trigger signal SA, entry of the photon P into the SSPD 11B through the optical fiber cable 10B is delayed by a time interval $\Delta Bx$ with respect to the trigger signal SA, entry of the photon P into the SSPD 11C through the optical fiber cable 10C is delayed by a time interval $\Delta Cx$ with respect to the trigger signal SA, and entry of the photon P into the SSPD 11D through the optical fiber cable 10D is delayed by a time interval $\Delta Dx$ with respect to the trigger signal SA. As shown in FIGS. 2 and 3, the SSPDs 11A, 11B, 11C, and 11D output pulse signals 20A, 20B, 20C, and 20D, respectively, based on the times of delayed entry of the photon P. As shown in FIGS. 2 and 3, the SFQ circuit 12A outputs a train of pulse signals 21A, 21B, 21C, and 21D to the single transmission cable 13 based on the rising waveforms of the pulse signals 20A, 20B, 20C, and 20D.

In the example of FIG. 3, the photons PA, PC, and PD are emitted from the light source in synchronization with a trigger signal SB having a cycle B subsequent to the cycle A. Due to the photon delay effect in the optical fiber cables 10A, 10C, and 10D, entry of the photon P into the SSPD 11A through the optical fiber cable 10A is delayed by a time interval $\Delta Ax$ with respect to the trigger signal SB, entry of the photon P into the SSPD 11C through the optical fiber cable 10C is delayed by a time interval ΔCx with respect to the trigger signal SB, and entry of the photon P into the SSPD 11D through the optical fiber cable 10D is delayed by a time interval ΔDx with respect to the trigger signal SB. As shown in FIG. 3, the SSPDs 11A, 11C, and 11D output pulse signals 20A, 20C, and 20D, respectively, based on the times of delayed entry of the photon P. As shown in FIG. 3, the SFQ circuit 12A outputs a train of pulse signals 21A, 21C, and 21D to the single transmission cable 13 based on the rising waveforms of the pulse signals 20A, 20C, and 20D.

As shown in the cycle A of FIG. 3, a difference Td (ΔBx−ΔAx) in the entry time of the photon P between the SSPDs 11A and 11B is greater than a pulse width Tw of the pulse signal 21A output from the SFQ circuit 12A. A difference (ΔCx−ΔBx) in the entry time of the photon P between the SSPDs 11B and 11C is greater than a pulse width of the pulse signal 21B output from the SFQ circuit 12A. A difference (ΔDx−ΔCx) in the entry time of the photon P between the SSPDs 11C and 11D is greater than a pulse width of the pulse signal 21C output from the SFQ circuit 12A.

Thus, in the superconducting single-photon detection system 100 of the present working example, the train of pulse signals 21A, 21B, 21C, and 21D resulting from multiplexing by the SFQ circuit 12A includes information indicating which of the SSPDs 11A, 11B, 11C, and 11D each pulse signal is derived from.

As shown in the cycle A of FIG. 3, in the superconducting single-photon detection system 100 of the present working example, each of the pulse signals 21A, 21B, 21C, and 21D has a smaller pulse width than a corresponding one of the pulse signals 20A, 20B, 20C, and 20D. For instance, in the example of FIG. 3, the pulse width of each of the pulse signals 20A, 20B, 20C, and 20D is from about 10 to several hundreds of nanoseconds (ns), while the pulse width of each of the pulse signals 21A, 21B, 21C, and 21D is about 1 ns. Even when the difference in the entry time of the photon P is, for example, about 2 ns, the pulse signals 21A, 21B, 21C, and 21D generated based on the pulse signals 20A, 20B, 20C, and 20D, respectively, can be suitably separated from each other.

Thus, in the superconducting single-photon detection system 100 of the present working example, the difference in the entry time of the photon P can be smaller than in any case where the SFQ circuit 12A outputs the pulse signals 20A, 20B, 20C, and 20D coming from the SSPDs 11A, 11B, 11C, and 11D without reshaping the pulse signals 20A, 20B, 20C, and 20D. As such, the superconducting single-photon detection system 100 of the present working example can suitably shorten the duration of the train of pulse signals 21A, 21B, 21C, and 21D resulting from multiplexing by the SFQ circuit 12A.

When used, for example, in a quantum network or a quantum computer, the superconducting single-photon detection system 100 of the present working example can increase the operation speed of the quantum network or the quantum computer.

In the superconducting single-photon detection system 100 of the present working example, as shown in an enlarged portion of FIG. 3, the time at which the pulse signal 21A is output from the SFQ circuit 12A varies depending on the time at which the photon PA is emitted from the light source. Specifically, if a photon is emitted from the light source earlier than the photon PA, the resulting pulse signal output from the SFQ circuit 12A shifts forward relative to the pulse signal 21A, as indicated by the dotted line in the enlarged portion of FIG. 3. If a photon is emitted from the light source later than the photon PA, the resulting pulse signal output from the SFQ circuit 12A shifts backward relative to the pulse signal 21A, as indicated by the dashed-dotted line in the enlarged portion of FIG. 3.

As described above, in the superconducting single-photon detection system 100 of the present working example, each of the pulse signals 21 resulting from multiplexing by the SFQ circuit 12A has a time information identifying function for identifying the time at which the photon was emitted from the light source.

The other features of the superconducting single-photon detection system 100 of the present working example may be the same as those of the superconducting single-photon detection system 100 of the first embodiment.

(Variant)

Figure 4A:
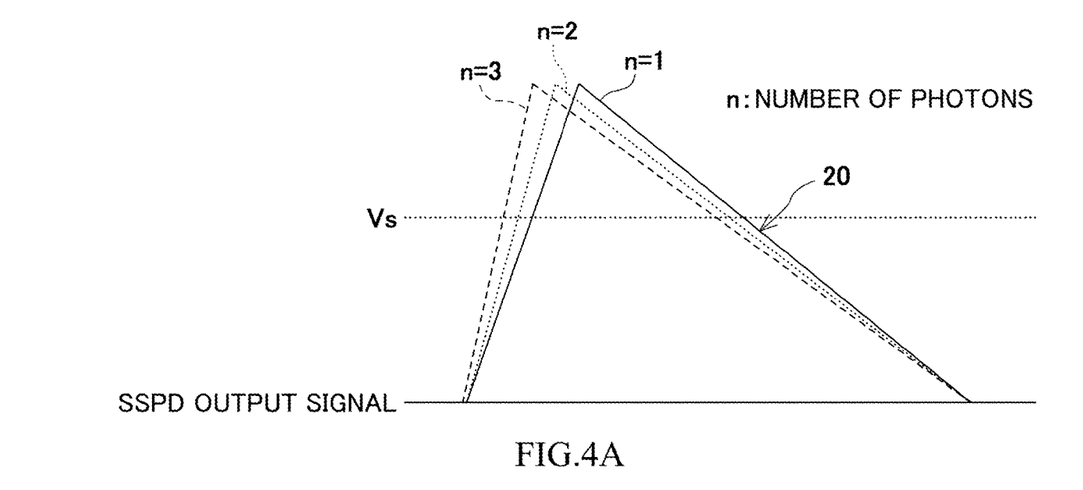
FIG. 4A shows examples of output signals of a superconducting single-photon detection system according to a variant of the first embodiment.
Figure 4B:
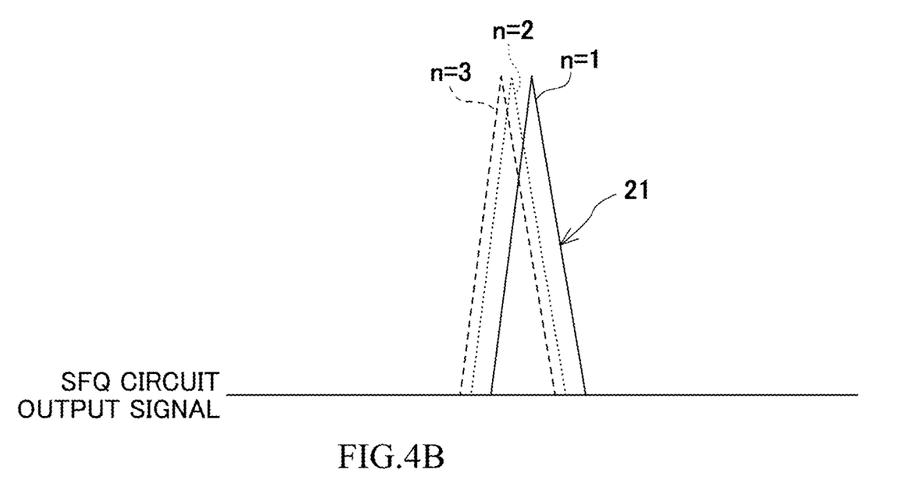
FIG. 4B shows examples of output signals of the superconducting single-photon detection system according to the variant of the first embodiment.

FIGS. 4A and 4B show examples of output signals of a superconducting single-photon detection system according to a variant of the first embodiment.

FIG. 4A depicts the waveform of the pulse signal 20 output from a corresponding one of the SSPDs 11 and shows how the waveform of the pulse signal 20 changes according to the number n of photons P which enter the SSPD 11. Specifically, the pulse signal 20 output when one photon P enters the SSPD 11 (n=1) is depicted by a solid line. The pulse signal 20 output when two photons P enter the SSPD 11 at the same time (n=2) is depicted by a thin dotted line. The pulse signal 20 output when three photons P enter the SSPD 11 at the same time (n=3) is depicted by a thick dotted line.

As seen from FIG. 4A, the slope of the rising waveform of the pulse signal 20 varies depending on the number of the photons P which enter the SSPD 11. That is, the greater the number n of the photons P which enter the SSPD 11 at the same time, the steeper the slope of the rising waveform of the pulse signal 20.

FIG. 4B depicts the waveform of the pulse signal 21 output from the SFQ circuit 12A and shows how the waveform of the pulse signal 21 changes according to the number n of photons P which enter a corresponding one of the SSPD 11. Specifically, the SFQ circuit 12A outputs the pulse signal 21 at a time at which the output value of the rising waveform of the pulse signal 20 reaches a predetermined level Vs. The pulse signal 21 output when one photon P enters the SSPD 11 (n=1) is depicted by a solid line. The pulse signal 21 output when two photons P enter the SSPD 11 at the same time (n=2) is depicted by a thin dotted line. The pulse signal 21 output when three photons enter the SSPD 11 at the same time (n=3) is depicted by a thick dotted line.

As shown in FIG. 4 (*b*), the greater the number n of the photons P which enter the SSPD 11 at the same time, the earlier the pulse signal 21 is output from the superconducting logic circuit 12.

Thus, in the superconducting single-photon detection system 100 of the present variant, the pulse signal 21 resulting from multiplexing by the SFQ circuit 12A includes photon number identification information for identifying the number n of the photons P which entered a corresponding one of the SSPDs 11.

The other features of the superconducting single-photon detection system 100 of the present variant may be the same as those of the superconducting single-photon detection system 100 of the first embodiment or the working example of the first embodiment.

Second Embodiment

A superconducting single-photon detection system 100 of a second embodiment is the same as the superconducting single-photon detection system 100 of the first embodiment, except that the superconducting single-photon detection system 100 of the second embodiment includes a self-resetting output circuit which will be described below.

Figure 5A:
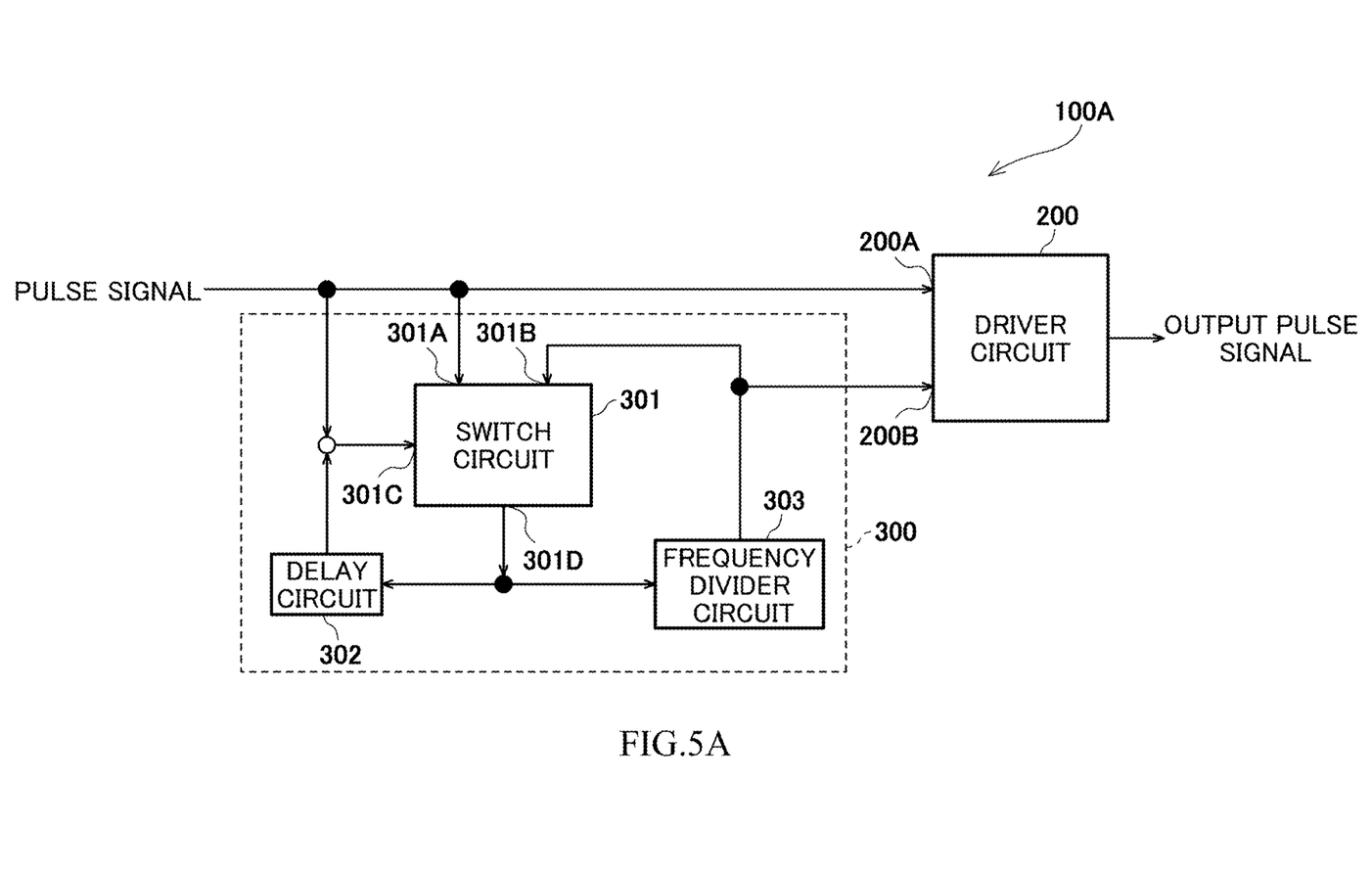
FIG. 5A shows an example of an output circuit of a superconducting single-photon detection system of a second embodiment.
Figure 5B:
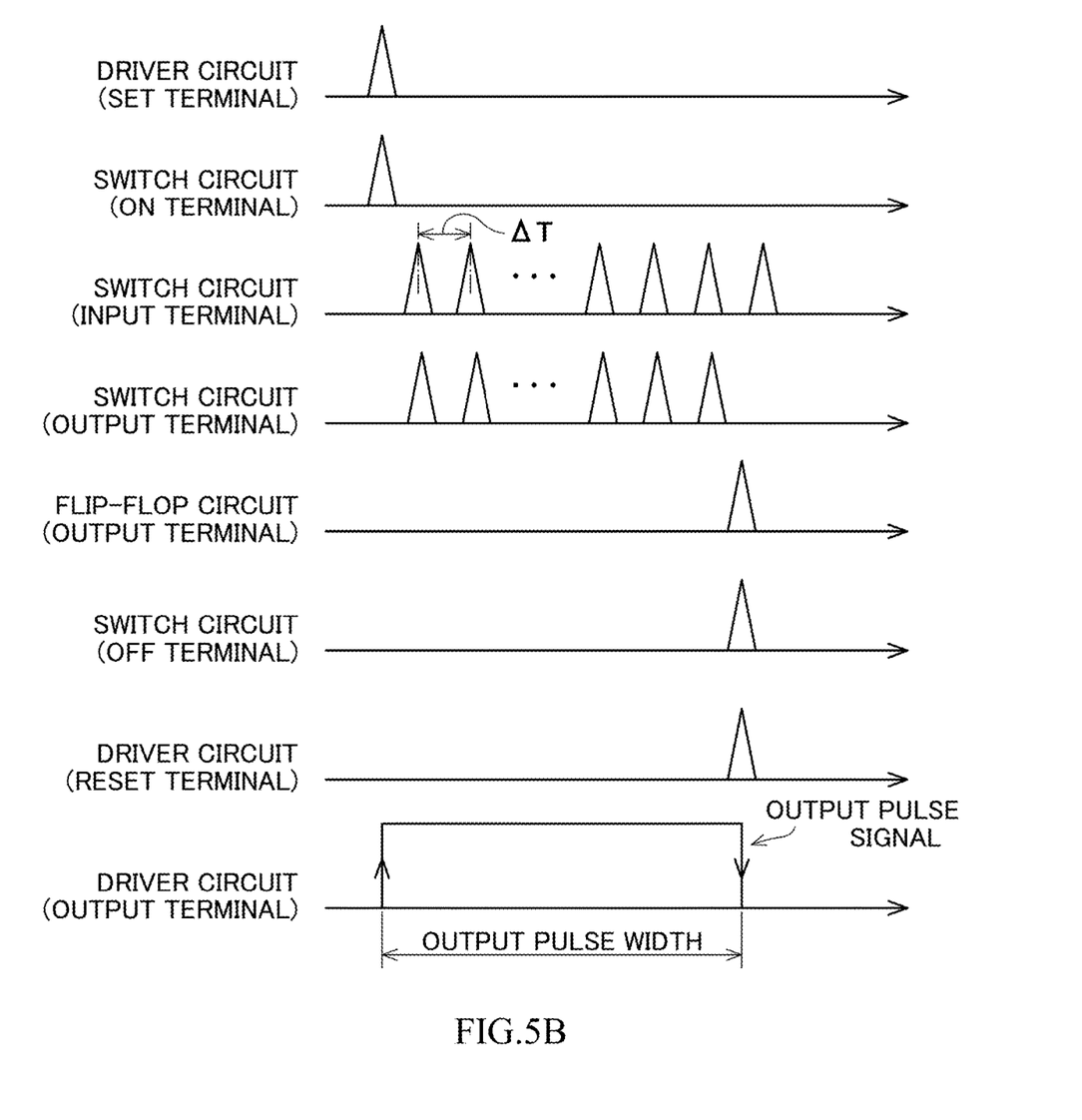
FIG. 5B shows examples of time charts of signals in the output circuit of the superconducting single-photon detection system of the second embodiment.

FIG. 5A shows an example of the output circuit of the superconducting single-photon detection system of the second embodiment. FIG. 5B shows examples of time charts of signals in the output circuit of the superconducting single-photon detection system of the second embodiment.

Figure 6:
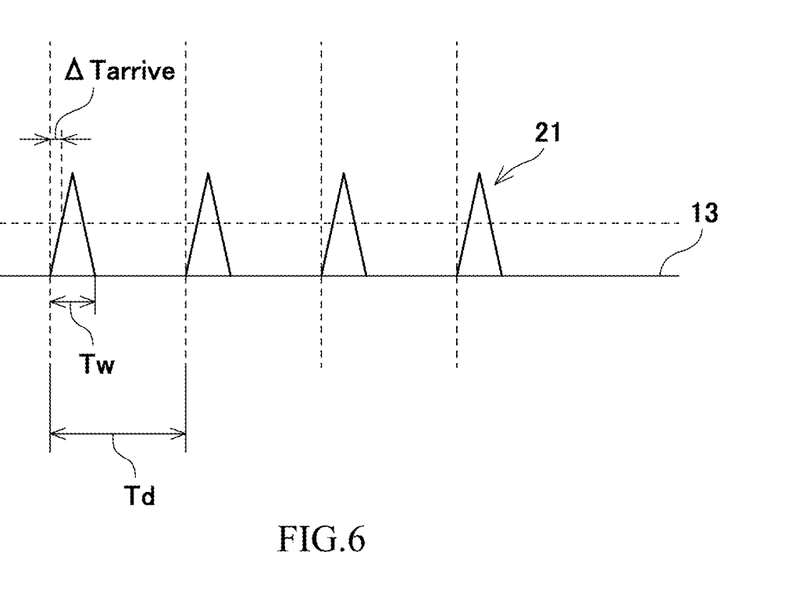
FIG. 6 illustrates a difference Td in photon entry time between optical transmission paths, a width Tw of a pulse signal output from a SFQ circuit, and "photon input duration ΔTarrive".

As described in the first embodiment, the superconducting single-photon detection system 100 is configured such that: the time delay until the photon P emitted from the light source enters each of the SSPDs 11 is different for each of the optical transmission paths 10; and, as shown in FIG. 6, the difference Td in the entry time of the photon P between the optical transmission paths 10 is greater than the width Tw of the pulse signals 21 output from the SFQ circuit 12A.

The pulse signals 20 output from the SSPDs 11 (see FIG. 2) merge in the SFQ circuit 12A, from which the pulse signals 21 having a pulse width Tw of about 1 ns are output. Thus, as shown in FIG. 6, when the difference Td in the entry time of the photon P is sufficiently greater than the pulse width Tw, output information from each of the SSPDs 11 (such as photon input duration ΔTarrive) is held in a train of pulses arranged on the time axis in the single transmission cable 13.

The output circuit of the superconducting single-photon detection system 100 may be configured to set the pulse width Tw of the pulse signals 21 to a desired value, and this configuration offers various benefits.

As shown in FIG. 5A, the output circuit 100A of the superconducting single-photon detection system 100 includes a driver circuit 200 and a reset signal generating circuit 300. The output circuit 100A is configured, for example, as a superconducting flux quantum (SFQ) circuit. Thus, the output circuit 100A is cooled to an extremely low temperature by a suitable refrigerator (e.g., a GM refrigerator) so that the output circuit 100A can operate in a superconducting state.

In FIG. 5A, each of the black circles represents a splitter circuit that divides one transmission cable into two branches. A pulse signal transmitted in the one transmission cable is delivered into the branches through the splitter circuit. This kind of splitter circuit is well-known and will not be described in detail.

In FIG. 5A, the white circle represents a merger circuit that combines two transmission cables into one combined path. Pulse signals transmitted in the two transmission cables are delivered into the combined path through the merger circuit. This kind of merger circuit is well-known and will not be described in detail.

Figure 7A:
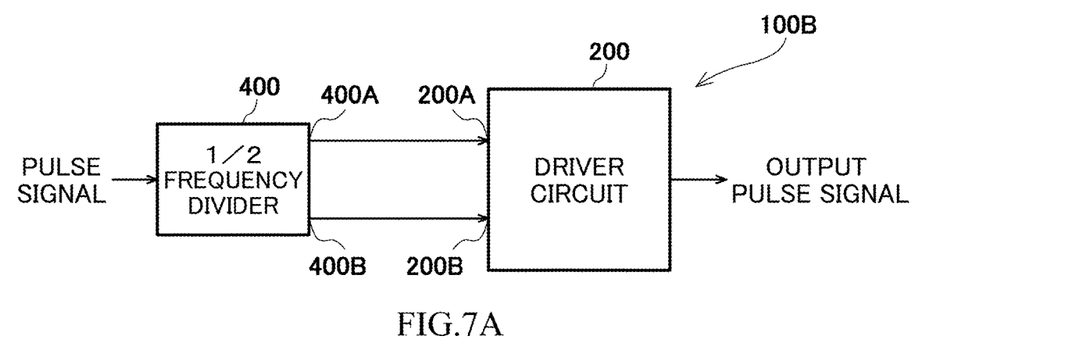
FIG. 7A shows an example of an output circuit of a superconducting single-photon detection system of a third embodiment.

In FIG. 5A, each of the arrows indicates the direction of signal transmission in the transmission cable (the same applies to FIG. 7A).

The driver circuit 200 functions as a voltage amplifier for pulse signals. The driver circuit 200 includes a set terminal 200A, to which the pulse signal 21 output from the SFQ circuit 12A is input as a set signal. The driver circuit 200 includes a reset terminal 200B, to which a reset signal generated by the reset signal generating circuit 300 is input at a certain time. Thus, as shown in FIG. 5B, the pulse width of an output pulse signal output from the output terminal of the driver circuit 200 corresponds to a time difference between a time at which the set signal is input to the driver circuit 200 and a time at which the reset signal is input to the driver circuit 200.

The reset signal generating circuit 300 is a circuit that generates the reset signal for the driver circuit 200 based on the pulse signal 21.

Specifically, as shown in FIG. 5A, the reset signal generating circuit 300 includes: a switch circuit 301 including an ON terminal 301A, an OFF terminal 301B, an input terminal 301C, and an output terminal 301D; a delay circuit 302; and a frequency divider circuit 303 including a number N of ½ frequency dividers (N is an integer of 1 or more).

The switch circuit 301 is configured such that input of a signal to the ON terminal 301A enables communication between the input terminal 301C and the output terminal 301D in the switch circuit 301 and that input of a signal to the OFF terminal 301B disables the communication between the input terminal 301C and the output terminal 301D in the switch circuit 301.

As shown in FIG. 5A, the transmission cable connected to the set terminal 200A of the driver circuit 200 is connected to both the ON terminal 301A and the input terminal 301C of the switch circuit 301.

The switch circuit 301 can be configured, for example, using a known non-destructive read-out cell, and the internal configuration of the switch circuit 301 will not be described in detail.

The delay circuit 302 delays the pulse signal output from the output terminal 301D of the switch circuit 301 by a desired time delay ΔT and outputs the resulting pulse signal to the input terminal 301C of the switch circuit 301. That is, in the reset signal generating circuit 300 of the present embodiment, the output terminal 301D of the switch circuit 301 is connected to the input terminal 301C of the switch circuit 301 via the delay circuit 302.

Thus, when the pulse signal 21 (ON signal) is input to the ON terminal 301A and the input terminal 301C of the switch circuit 301, the pulse signal output from the output terminal 301D of the switch circuit 301 passes through the delay circuit 302 and is thus delayed by the time delay AT as shown in FIG. 5B, and then the pulse signal is input to the input terminal 301C of the switch circuit 301 again. The pulse signal circulates in and between the switch circuit 301 and the delay circuit 302 by passing through the output terminal 301D of the switch circuit 301, the delay circuit 302, and the input terminal 301C of the switch circuit 301 in this order until a signal is input to the OFF terminal 301B of the switch circuit 301.

The time delay AT in the delay circuit 302 can be set to a desired value, for example, by adjusting the length of a transmission cable used in the delay circuit 302.

The frequency divider circuit 303 includes a number N of ½ frequency dividers, by which, once a pulse number Np of the pulse signal output from the output terminal 301D of the switch circuit 301 reaches a predetermined count Nc (Np=Nc), the frequency divider circuit 303 outputs suitable signals to the OFF terminal 301B of the switch circuit 301 and the reset terminal 200B of the driver circuit 200. That is, in the reset signal generating circuit 300 of the present embodiment, the output terminal 301D of the switch circuit 301 is connected to the OFF terminal 301B of the switch circuit 301 and the reset terminal 200B of the driver circuit 200 via the frequency divider circuit 303.

The count Nc in the frequency divider circuit 303 can be set to a desired value by adjusting the number N of the ½ frequency dividers used in the frequency divider circuit 303.

As described above, in the output circuit 100A of the superconducting single-photon detection system 100 of the present embodiment, the time at which a signal is input to the reset terminal 200B of the driver circuit 200 is determined by the time delay ΔT of the pulse signal in the delay circuit 302 and the number N of the ½ frequency dividers in the frequency divider circuit 303.

Thus, the superconducting single-photon detection system 100 of the present embodiment, which includes the driver circuit 200 and the reset signal generating circuit 300, can set the width of the output pulse signal output from the driver circuit 200 to a desired value. Specifically, in the superconducting single-photon detection system 100 of the present embodiment, the time at which a signal is input to the reset terminal 200B of the driver circuit 200 can be determined as appropriate by the time delay ΔT of the pulse signal in the delay circuit 302 and the number N of the ½ frequency dividers in the frequency divider circuit 303. This makes it possible to set the width of the output pulse signal output from the driver circuit 200 to a desired value.

Thus, an output pulse signal train matching the specifications required in a subsequent signal processor or a subsequent application can be generated, for example, by appropriately combining the width of the output pulse signal output from the driver circuit 200 and the difference Td in the entry time of the photon P (see FIG. 6).

For example, in the case where a subsequent signal processor is required to process signals quickly, the overall duration of the output pulse signal train can be suitably shortened by reducing the width of the output pulse signal output from the driver circuit 200 and the difference Td in the entry time of the photon P. Signal read-out in a subsequent signal processor can be facilitated by increasing the width of the output pulse signal output from the driver circuit 200. The width of the output pulse signal output from the driver circuit 200 and the difference Td in the entry time of the photon P can be set as appropriate according to the "photon input duration ΔTarrive" which may be required in a subsequent signal processor or a subsequent application.

The other features of the superconducting single-photon detection system 100 of the present embodiment may be the same as those of the superconducting single-photon detection system 100 of the first embodiment, the working example of the first embodiment, or the variant of the first embodiment.

Third Embodiment

A superconducting single-photon detection system 100 of a third embodiment is the same as the superconducting single-photon detection system 100 of the first embodiment, except that the superconducting single-photon detection system 100 of the third embodiment includes a voltage-inverting output circuit which will be described below.

Figure 7B:
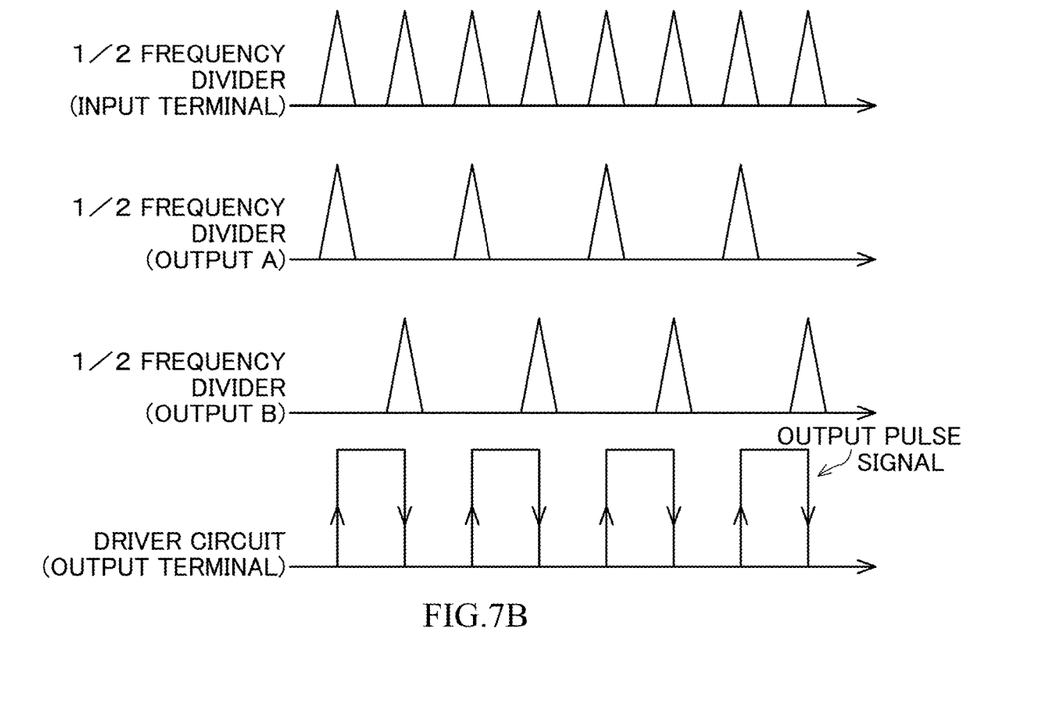
FIG. 7B shows examples of time charts of signals in the output circuit of the superconducting single-photon detection system of the third embodiment.

FIG. 7A shows an example of the output circuit of the superconducting single-photon detection system of the third embodiment. FIG. 7B shows examples of time charts of signals in the output circuit of the superconducting single-photon detection system of the third embodiment.

As shown in FIG. 7A, the output circuit 100B of the superconducting single-photon detection system 100 includes: a ½ frequency divider 400 to which the pulse signal 21 output from the SFQ circuit 12A is input; and a driver circuit 200 connected to the ½ frequency divider 400. The output circuit 100B is configured, for example, as a superconducting single flux quantum (SFQ) circuit. Thus, the output circuit 100B is cooled to an extremely low temperature by a suitable refrigerator (e.g., a GM refrigerator) so that the output circuit 100B can operate in a superconducting state.

The driver circuit 200 is the same as that of the second embodiment and will not be described again.

In the output circuit 100B of the superconducting single-photon detection system 100 of the present embodiment, the ½ frequency divider 400 includes an output terminal 400A connected to the set terminal 200A of the driver circuit 200 and an output terminal 400B connected to the reset terminal 200B of the driver circuit 200. In this example, as shown in FIG. 7B, when the number of times the pulse signal 21 has been input to the ½ frequency divider 400 is an odd number, a signal is output from the output terminal 400A of the ½ frequency divider 400, while when the number of times the pulse signal 21 has been input to the ½ frequency divider 400 is an even number, a signal is output from the output terminal 400B of the ½ frequency divider 400.

Thus, as shown in FIG. 7B, whenever the number of times of pulse signal input to the ½ frequency divider 400 is an odd number, the voltage of the signal output from the driver circuit 200 is inverted from a low-potential level to a high-potential level. Whenever the number of times of pulse signal input to the ½ frequency divider 400 is an even number, the voltage of the signal output from the driver circuit 200 is inverted from the high-potential level to the low-potential level.

Thus, in the superconducting single-photon detection system 100 of the present embodiment, the output pulse signal output from the driver circuit 200 is in a voltage-inverting form, and this makes it possible to identify output information from each of the SSPDs 11 at the time at which the voltage is inverted. As such, the duration of an output pulse signal train can be shorter than in any case where the output pulse signal is in a pulse form.

The other features of the superconducting single-photon detection system 100 of the present embodiment may be the same as those of the superconducting single-photon detection system 100 of the first embodiment, the working example of the first embodiment, the variant of the first embodiment, or the second embodiment.

The first embodiment, the working example of the first embodiment, the variant of the first embodiment, the second embodiment, and the third embodiment may be combined unless they conflict with each other. From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

INDUSTRIAL APPLICABILITY

Aspects of the present disclosure are applicable to a superconducting single-photon detection system in which output signals from SSPDs that are independent of each other and in one-to-one correspondence with a plurality of optical transmission paths can be processed more suitably than ever before.

REFERENCE CHARACTER LIST

10: optical transmission path
10A: optical fiber cable
10B: optical fiber cable
10C: optical fiber cable
10D: optical fiber cable 12: superconducting logic circuit
12A: SFQ circuit
13: transmission cable
20: pulse signal
20A: pulse signal
20B: pulse signal
20C: pulse signal
20D: pulse signal
21: pulse signal
21A: pulse signal
21B: pulse signal
21C: pulse signal
21D: pulse signal
30: refrigerator
100: superconducting single-photon detection system
100A: output circuit
100B: output circuit
200: driver circuit
200A: set terminal
200B: reset terminal
300: reset signal generating circuit
301: switch circuit
301A: ON terminal
301B: OFF terminal
301C: input terminal
301D: output terminal
302: delay circuit
303: frequency divider circuit
400: ½ frequency divider
400A: output terminal
400B: output terminal

The invention claimed is:

1. A superconducting single-photon detection system comprising:
   a plurality of optical transmission paths through each of which a photon emitted from a light source is transmitted;
   a plurality of superconducting single-photon detectors (hereinafter referred to as "SSPDs") that are independent of each other and in one-to-one correspondence with the optical transmission paths; and
   a superconducting logic circuit that multiplexes first pulse signals output from the SSPDs, wherein
   a photon entry time at which the photon enters each of the SSPDs through a corresponding one of the optical transmission paths is different for each of the optical transmission paths, and
   a difference in the photon entry time between the optical transmission paths is greater than a pulse width of a corresponding one of second pulse signals output from the superconducting logic circuit.

2. The superconducting single-photon detection system according to claim 1, wherein
   each of the optical transmission paths includes an optical fiber cable, and
   the optical fiber cables of the optical transmission paths have different cable lengths.

3. The superconducting single-photon detection system according to claim 1, wherein
   a time at which each of the second pulse signals is output varies depending on a time at which the photon is emitted from the light source.

4. The superconducting single-photon detection system according to claim 1, wherein each of the second pulse signals has a smaller pulse width than a corresponding one of the first pulse signals.

5. The superconducting single-photon detection system claim 1, wherein
   a slope of a rising waveform of each of the first pulse signals varies depending on the number of the photons that enter a corresponding one of the SSPDs after being emitted from the light source, and
   the superconducting logic circuit outputs each of the second pulse signals at a time at which an output value of the rising waveform of a corresponding one of the first pulse signals reaches a predetermined level.

6. The superconducting single-photon detection system according to claim 1, further comprising:
   a driver circuit to which each of the second pulse signals output from the superconducting logic circuit is input as a set signal; and
   a reset signal generating circuit that generates a reset signal for the driver circuit based on each of the second pulse signals, wherein
   a width of an output pulse signal output from the driver circuit corresponds to a time difference between a time at which the set signal is input to the driver circuit and a time at which the reset signal is input to the driver circuit.

7. The superconducting single-photon detection system according to claim 6, wherein
   the reset signal generating circuit includes
      a switch circuit including an ON terminal, an OFF terminal, an input terminal, and an output terminal,
      a delay circuit, and
      a frequency divider circuit including a number N of ½ frequency dividers, wherein N is an integer of 1 or more,
   input of a signal to the ON terminal of the switch circuit enables communication between the input terminal and the output terminal in the switch circuit,
   input of a signal to the OFF terminal of the switch circuit disables the communication between the input terminal and the output terminal in the switch circuit,
   in the reset signal generating circuit, the output terminal of the switch circuit is connected to the input terminal of the switch circuit via the delay circuit and connected to the OFF terminal of the switch circuit and a reset terminal of the driver circuit via the frequency divider circuit, and
   a time at which a signal is input to the reset terminal of the driver circuit is determined by a time delay of a pulse signal in the delay circuit and the number N of the ½ frequency dividers in the frequency divider circuit.

8. The superconducting single-photon detection system according to claim 1, further comprising:
   a ½ frequency divider to which each of the second pulse signals output from the superconducting logic circuit is input; and
   a driver circuit connected to the ½ frequency divider, wherein the ½ frequency divider includes first and second output terminals, one of which is connected to a set terminal of the driver circuit and the other of which is connected to a reset terminal of the driver circuit.

* * * * *